(12) United States Patent  
Harvey

(10) Patent No.: US 6,722,386 B2  
(45) Date of Patent: Apr. 20, 2004

(54) FLOW CONTROL APPARATUS AND METHOD

(76) Inventor: Bruce Harvey, 535 Cox Rd., Roswell, GA (US) 30075

( * ) Notice: Subject to any disclaimer, the term of this patent is extended or adjusted under 35 U.S.C. 154(b) by 0 days.

(21) Appl. No.: 10/458,549

(22) Filed: Jun. 10, 2003

(65) Prior Publication Data

US 2003/0196694 A1 Oct. 23, 2003

Related U.S. Application Data

(63) Continuation-in-part of application No. 09/672,845, filed on Sep. 28, 2000, now Pat. No. 6,626,202.

(51) Int. Cl.[7] .............................. E03B 7/10; E03B 7/12; F16K 31/64
(52) U.S. Cl. .............................. 137/62; 137/59; 137/79; 236/101 R
(58) Field of Search .............................. 137/59, 62, 615, 137/79; 251/208, 11; 236/101 R, 101 D

(56) References Cited

U.S. PATENT DOCUMENTS

| 299,392 | A | * | 5/1884 | Jay | 137/62 |
| 330,664 | A | * | 11/1885 | Bacon et al. | 137/62 |
| 351,093 | A | * | 10/1886 | Browne | 137/59 |
| 360,139 | A | * | 3/1887 | Browne | 137/59 |
| 360,140 | A | * | 3/1887 | Browne | 137/59 |
| 1,277,197 | A | * | 8/1918 | Crandon et al. | 137/59 |
| 2,214,844 | A | * | 9/1940 | Van Keuren et al. | 137/62 |
| 2,777,303 | A | * | 1/1957 | Slattery | 137/62 |
| 2,999,512 | A | * | 9/1961 | Barkow | 251/208 |
| 3,075,704 | A | * | 1/1963 | Stump | 137/62 |
| 4,066,090 | A | * | 1/1978 | Nakajima et al. | 137/62 |
| 4,205,698 | A | | 6/1980 | Hucks | 137/62 |
| 4,243,062 | A | * | 1/1981 | Shelton | 137/62 |
| 4,286,613 | A | * | 9/1981 | Lacoste | 137/62 |
| 4,327,761 | A | * | 5/1982 | Shelton | 137/62 |
| 4,360,036 | A | * | 11/1982 | Shelton | 137/62 |
| 4,437,481 | A | | 3/1984 | Chamberlin et al. | 137/60 |
| 4,484,594 | A | | 11/1984 | Alderman | 137/62 |
| 4,809,727 | A | * | 3/1989 | Chamberlin | 137/62 |
| 4,852,601 | A | * | 8/1989 | Chamberlin | 137/62 |
| 5,025,832 | A | * | 6/1991 | Taylor | 251/208 |
| 5,088,689 | A | * | 2/1992 | Hendricks et al. | 251/208 |
| 6,003,538 | A | * | 12/1999 | Smith | 137/62 |

FOREIGN PATENT DOCUMENTS

| GB | 534544 | * | 3/1941 | 137/62 |

* cited by examiner

*Primary Examiner*—George L. Walton  
(74) *Attorney, Agent, or Firm*—Thomas, Kayden, Horstemeyer & Risley, LLP

(57) ABSTRACT

The present invention provides a flow control apparatus and method. In accordance with the present invention, the flow control apparatus comprises a thermostat that automatically actuates valve to enable water to flow through the valve when the temperature of the air or water is at or near the freezing temperature of water (32° F.). When the temperature of the air or water rises above freezing, the thermostat causes the valve to close, thereby preventing water from flowing through the valve. Therefore, when the apparatus is coupled to an end of a water conduit, such as a water spigot or hose, water is allowed to flow through the conduit when the air or water temperature is at or near freezing to prevent the conduit from bursting due to water freezing and expanding within the conduit.

21 Claims, 10 Drawing Sheets

BIMETAL STRIP IS HELD IN ON EACH END BY PARTIAL SPHERICAL PROTRUSION ON THE BODY.

IN LINE WITH CUTOFF
1X MODEL

BLIND DRAIN
NO VALVE
1X
MODEL 2

FUNCTIONALITY AND RETENTION OF BIMETAL STRIP IS THE SAME AS THE "IN LINE WITH CUTOFF".

FLOW CONTROL APPARATUS AND METHOD

CROSS REFERENCE TO A RELATED APPLICATION

This application is a continuation-in-part application that claims priority to U.S. patent application entitled, A Flow Control Apparatus and Method, having Ser. No. 09/672,845, filed Sep. 28, 2000, now U.S. Pat. No. 6,626,202, which is entirely incorporated herein by reference.

TECHNICAL FIELD OF THE INVENTION

The present invention relates to a flow control apparatus that allows fluid to flow through a valve under a first set of conditions and which prevents fluid from flowing through the valve under a second set of conditions. The invention is particularly well suited for use with outside water spigots and hoses to ensure that water flows when the temperature of the water and/or the surrounding air is at or close to the freezing temperature of water to prevent pipes and hoses from bursting as a result of water freezing and expanding therein.

BACKGROUND OF THE INVENTION

During winter months when the air temperature drops below freezing (32° F.), water pipes and hoses may burst as a result of water within them freezing and expanding. It is common to allow water to flow through these conduits in order to prevent the water from freezing. Another alternative is to purge the conduits of water prior to the temperature dropping below freezing in order to ensure that they do not fracture in the event that the temperature drops below freezing.

Various types of devices have been developed that automatically enable water to flow through conduits when the air temperature drops below a certain temperature in order to prevent the conduits from bursting. However, these devices typically are relatively complicated and are comprised of many moving parts. Consequently, the devices are more likely to malfunction and thus require replacement or repair.

Accordingly, a need exists for a flow control apparatus that is reliable, less likely to malfunction than prior devices that perform the same function and that is relatively simple in design and inexpensive to manufacture.

SUMMARY OF THE INVENTION

The present invention provides a flow control apparatus and method. In accordance with the present invention, the flow control apparatus comprises a thermostat that automatically actuates valve to enable water to flow through the valve when the temperature of the air or water is at or near the freezing temperature of water (32° F.). When the temperature of the air and/or water rises above freezing, the thermostat causes the valve to close, thereby preventing water from flowing through the valve. Therefore, when the apparatus is coupled to an end of a water conduit, such as a water spigot or hose, water is allowed to flow through the conduit when the air and/or water temperature is at or near freezing to prevent the conduit from bursting due to water freezing and expanding within the conduit.

In accordance with the preferred embodiment of the present invention, the thermostat measures the temperature of the water flowing through the conduit and actuates the valve accordingly. In other words, when the temperature of the water flowing through the conduit drops below a particular temperature, the thermostat causes the valve to open, whereas when the temperature of the water flowing through the conduit rises above a particular temperature, the thermostat causes the valve to close. When the valve is open water is allowed to flow through the conduit, whereas when the valve is closed, water is not allowed to flow through the conduit.

In accordance with an alternative embodiment of the present invention, the thermostat measures the temperature of the air surrounding a portion of the conduit and actuates the valve accordingly. In other words, when the temperature of the air drops below a particular temperature, the thermostat causes the valve to open, whereas when the temperature of the air rises above a particular temperature, the thermostat causes the valve to close. When the valve is open water is allowed to flow through the conduit, whereas when the valve is closed, water is not allowed to flow through the conduit.

The apparatus of the present invention can be designed in several ways with several different thermostat/valve and housing designs. Preferably, the thermostat is comprised of a bi-metal strip that flexes in a direction away from the valve when the temperature of water surrounding the strip drops below a particular temperature. In accordance with this embodiment, the strip abuts an opening in the housing of the apparatus when the temperature of the water is above a certain temperature, which seals the opening and prevents water from flowing through it. Conversely, when the temperature of the water drops below a certain temperature, the strip flexes away from the opening, thereby allowing water to flow through the opening and out of the apparatus housing.

These and other features of the present invention will become apparent from the following description, drawings and claims.

DETAILED DESCRIPTION OF THE INVENTION

Figure 1A:
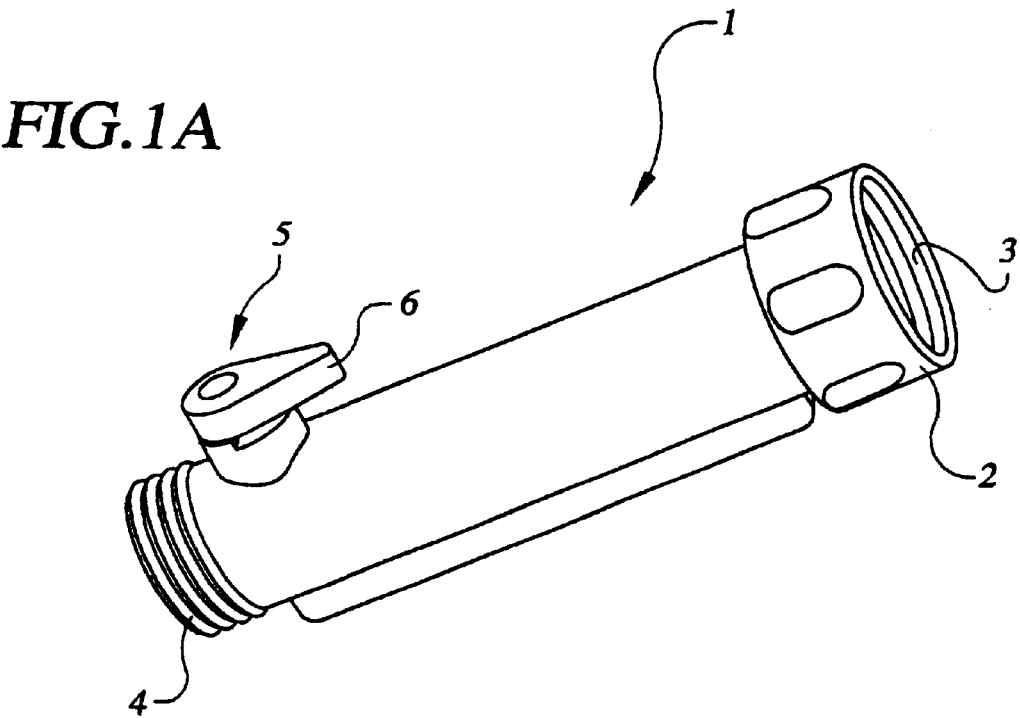
FIGS. 1A and 1B are perspective views of the flow control apparatus of the present invention in accordance with the preferred embodiment.
Figure 1B:
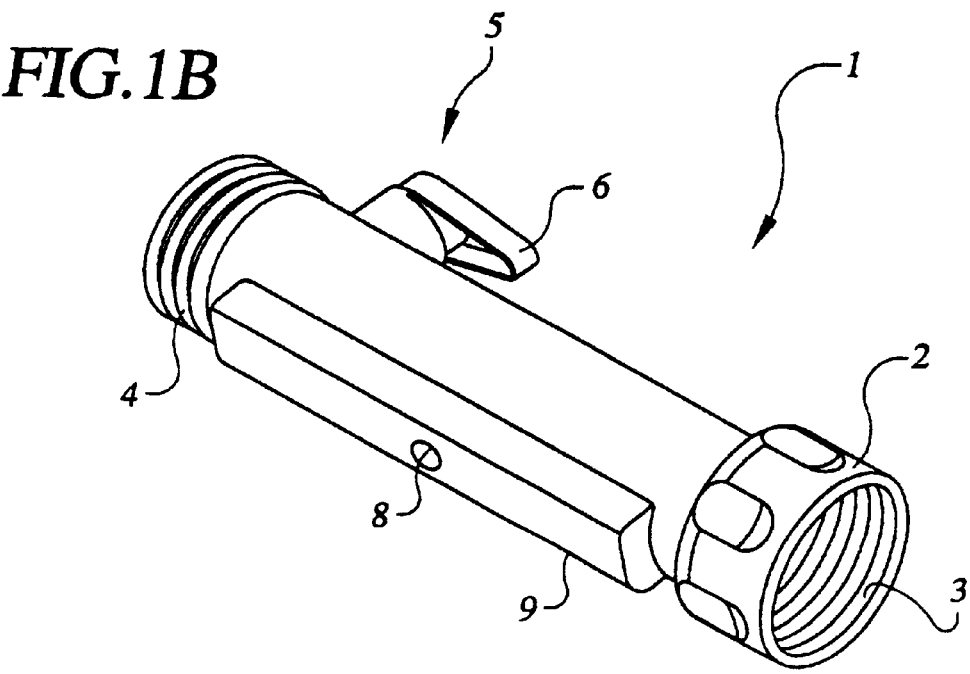

FIGS. 1A and 1B are perspective views of the flow control apparatus of the present invention in accordance with the preferred embodiment. The flow control apparatus 1 shown in FIGS. 1A and 1B comprises an end 2 having female threads 3 for connection to a hose bib of a water spigot or a male-threaded end of a water hose. The end 2 of the flow control apparatus 1 has a hose washer (not shown) seated therein to facilitate coupling the end 2 to a hose bib. When the apparatus 1 is coupled by the end 2 to a water spigot (not shown), the male-threaded end 4 of the apparatus 1 may be connected to the hose bib of a water hose (not shown).

The apparatus 1 preferably comprises a shut-off valve 5 that can be opened by turning lever 6 to enable water to flow through the apparatus 1 and into a water hose coupled to the male threaded end 4. In the event that the apparatus 1 is coupled to a water spigot but not to a water hose, the valve 5 can be turned off by turning the lever 6 to a closed position to prevent water from flowing out of the end 4 of the apparatus 1. In this case, the apparatus 1 functions as a cap for capping the end of a water spigot.

As shown in FIG. 1B, the housing 7 of the flow control apparatus 1 has an opening 8 formed therein. A flow control valve (not shown) is comprised in a flow control valve encasement 9 of the housing 7. The flow control valve within the encasement 9 automatically opens to allow water to flow through the opening 8 and out of the housing 7 under a first set of conditions and automatically closes under a second set of conditions to prevent water from flowing through the opening 8 and out of the housing 7. More particularly, when the temperature of water flowing through the apparatus 1 reaches a temperature that is near or at the freezing temperature of water, the flow control valve automatically opens thereby allowing water to flow out of the opening 8. When the temperature of the water rises to some temperature above freezing, the flow control valve closes thereby preventing water from flowing through the opening 8. By allowing water to flow through the opening 8 and out of the housing 7, the flow control apparatus 1 prevents the water from freezing and thus protects the conduit to which the apparatus 1 is connected from first.

Figure 2:
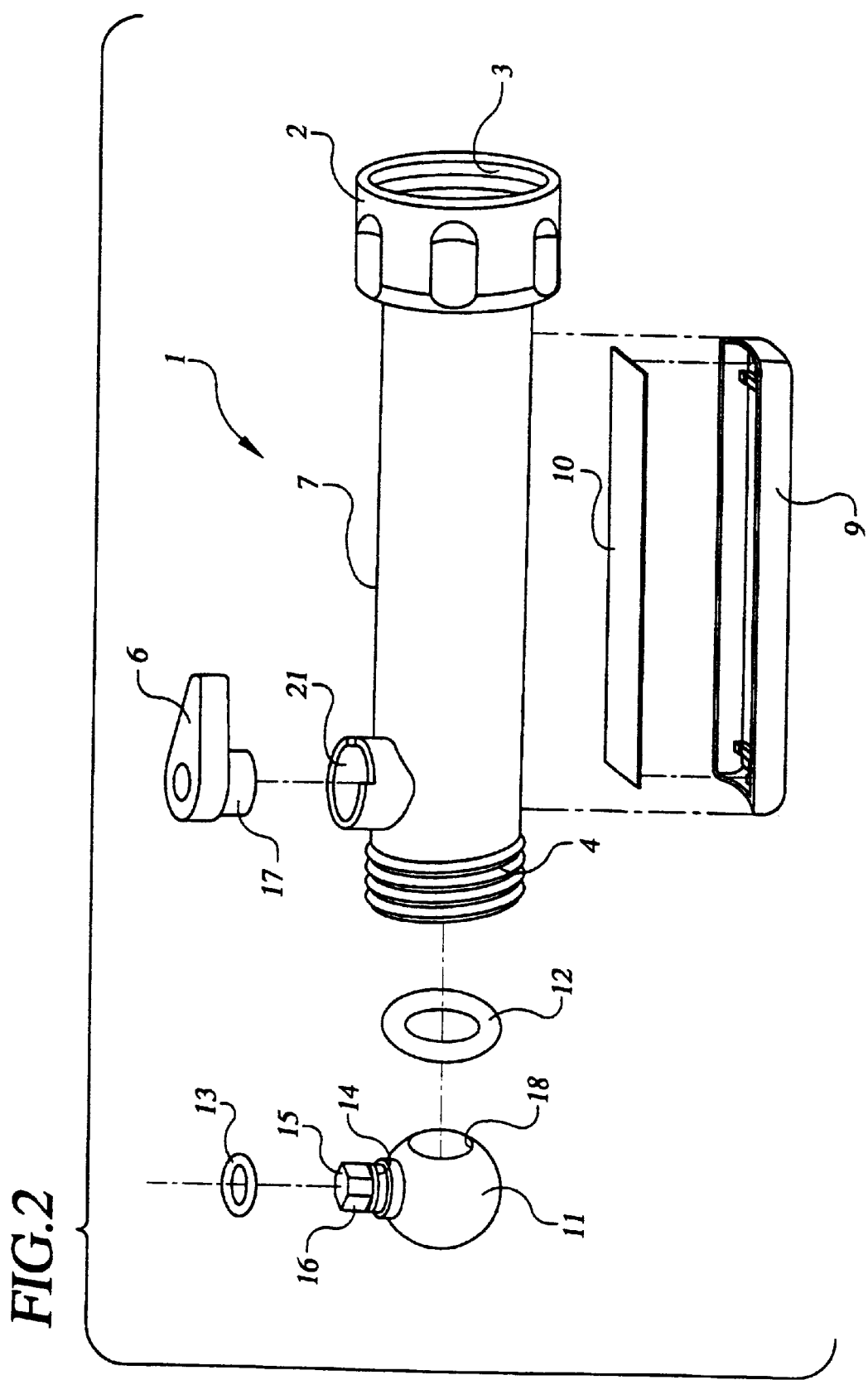
FIG. 2 is an exploded perspective view of the flow control apparatus of the present invention shown in FIG. 1.

FIG. 2 is a perspective, exploded view of the apparatus shown in FIGS. 1A and 1B. The flow control apparatus 1 comprises a bi-metal strip 10 that functions as a thermostat for controlling the flow water through the apparatus 1. The bi-metal strip 10 preferably is seated within a cradle (not shown) of the encasement 9. The manner in which the bi-metal strip 10 is attached within the encasement 9 is discussed below with reference to FIGS. 3A and 3B. The manner in which the bi-metal strip 10 functions as a thermostat to automatically open or close the valve opening 8 will be discussed below with reference to FIGS. 4A through 4C.

The shut-off valve 5 shown in FIGS. 1A and 1B is comprised of the lever 6, the ball 11, the O-ring 12, and the O-ring 13. The O-ring 13 is sized to fit snuggly about the lower end 14 of the ball stem 15. The upper end 16 of the ball stem 15 is octagonal in shape and is sized to mate with an octagonal-shaped portion formed within a section 17 of the lever 6. The O-ring 12 is attached to the outer surface of the ball 11 about an opening 18 formed through the ball 11. The opening 18 forms a cylindrical passageway through the ball 11. When the shut-off valve is assembled and coupled with the housing 7 of the apparatus 1, the stem 15 of the ball passes through the opening 21 formed in the housing 7 and the portion 17 of the lever 6 is connected therewith. The O-ring 13 forms a water-tight seal between the stem 15 and the inner surface of the portion 17 of the lever 6 to prevent water from passing through the opening 21 of the housing 7. Likewise, the O-ring 12 forms a watertight seal between the outer surface of the ball 11 and the inner surface of the housing 7 to prevent water from flowing out of the end 4 of the apparatus 1 when the shut-off valve is in the closed position.

When the shut-off valve is in the open position, the opening 18 formed through the ball 11 is concentric with the opening through the apparatus 1 to allow water to flow through the apparatus 1 in a direction from the female threaded end 3 toward the male threaded end 4. Therefore, when the flow control apparatus 1 is to be coupled on end 3 to a water spigot and on end 4 to a water hose, the shut-off valve may be opened to enable water to flow into the water hose. Alternatively, the shut-off valve may be closed to prevent water from flowing through the water hose. When the apparatus 1 is to be used as a cap, the shut-off valve is closed to prevent water from flowing out of the end 4 of the apparatus 1. In this case, the end 3 is coupled to the water spigot, but the end 4 is not coupled to a water hose. The apparatus 1 may also function as a cap on the end of the water hose opposite the end of the water hose that is coupled to the end 4 of the flow control apparatus 1. In this case, the shut-off valve may be closed to prevent water from flowing out of the end 4 of the apparatus 1. When used in this manner, the water spigot valve (not shown) would be opened so that the water hose and the apparatus 1 are filled with water the enable proper functioning of the flow control valve of the apparatus 1.

Figure 3A:
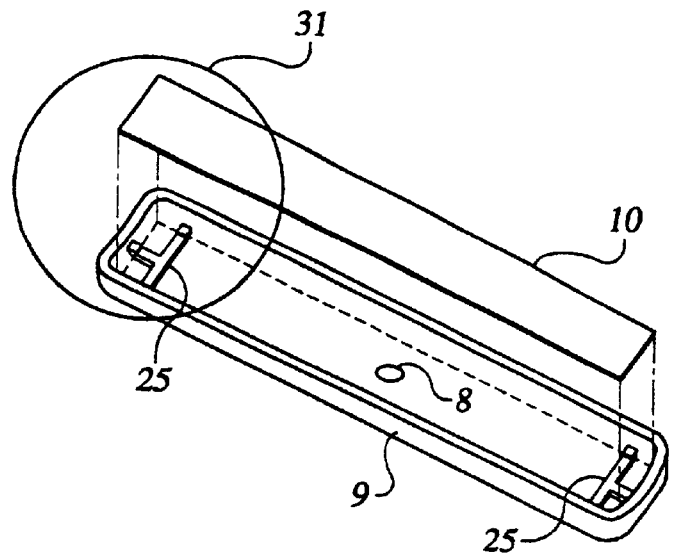
FIG. 3A illustrates the bi-metal strip positioning within the bi-metal cradle of the housing of the apparatus shown in FIG. 1.
Figure 3B:
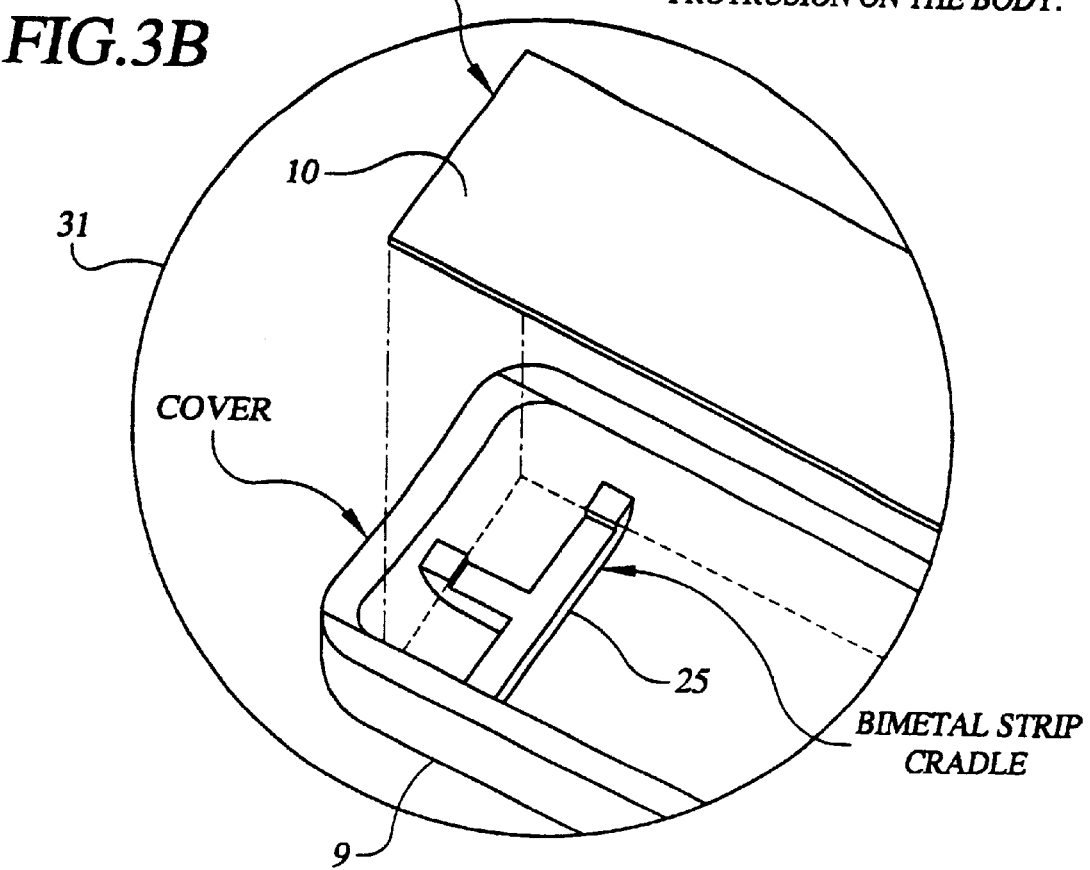
FIG. 3B is a magnified view of a portion of FIG. 3A.

FIG. 3A is a top perspective view of the encasement 9 shown in FIG. 2 and the bi-metal strip 10, which is shown being seated within a cradle 25 formed in the encasement 9. When assembled, the bi-metal strip 10 is seated within and is secured in place by the cradle 25 at each end of the encasement 9. FIG. 3B shows an expanded view of the portion 27 of the drawing shown in FIG. 3A. The expanded portion 31 shows one end of the encasement and of the bi-metal strip and illustrates the manner in which the bi-metal strip is seated within the cradle formed on each end of the encasement 9. The bi-metal strip 10 is held by the cradle 25 on each end of the encasement by partial spherical protrusions (not shown) formed on the housing 7 of the flow control apparatus 1. The protrusions can better be seen with reference to FIGS. 4A and 4B.

Figure 4A:
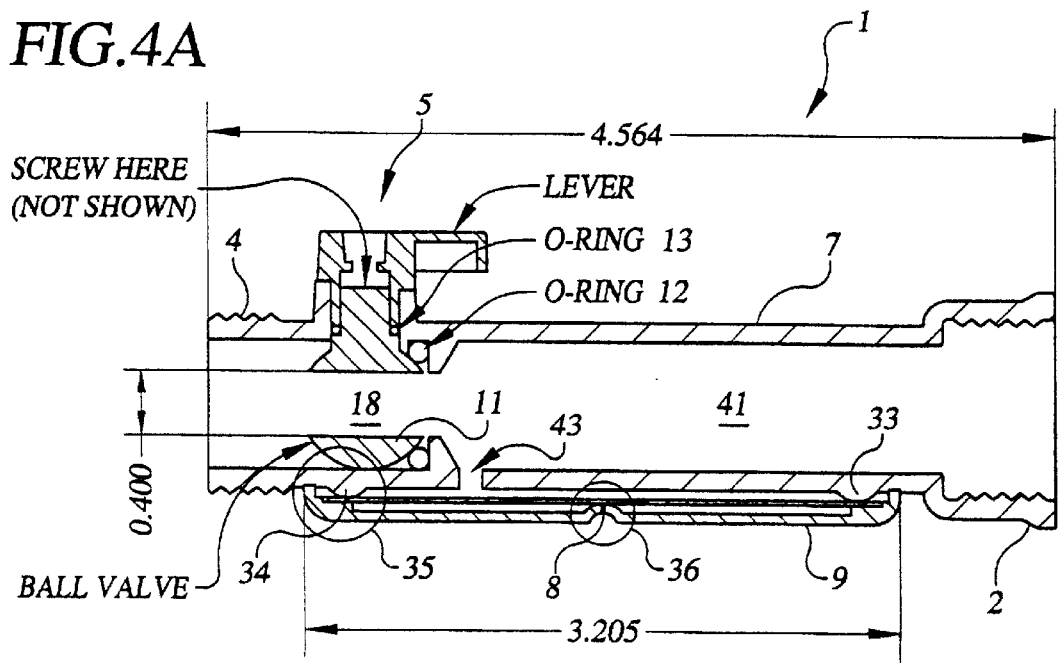
FIG. 4A is a cross-sectional view of the valve comprised by the apparatus shown in FIG. 1.
Figure 4B:
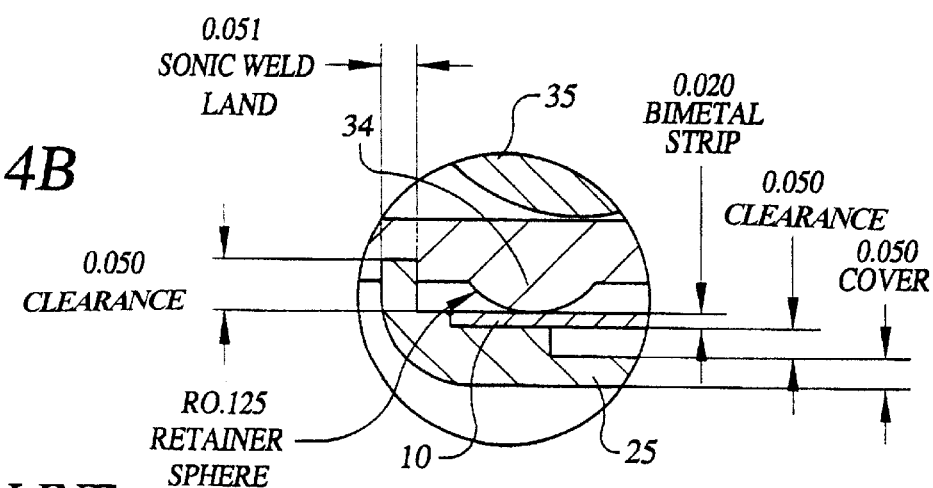
FIG. 4B is a magnified view of a portion of FIG. 4A.

FIG. 4A is a side cross-sectional view of the flow control apparatus 1 of the present invention, which illustrates the manner in which the bi-metal strip 10 is held in the cradle by the housing 7 of the flow control apparatus 1. FIG. 4A also demonstrates the manner in which the shut-off valve 5 is coupled with the housing 7 of the flow control apparatus 1. As shown in FIG. 4A, the bi-metal strip 10 is held in on each end of the cradle 25 by partial spherical protrusions 33 and 34 formed on the portion of the housing 7 that couples with the encasement 9. FIG. 4B is an expanded view of the portion 35 of the drawing shown in FIG. 4A. The manner in which the partial spherical protrusion 34 presses against the bi-metal strip 10 to hold it in place within the cradle 25 can be clearly seen. FIG. 4A also shows the opening 8 formed in the encasement 9 of the flow control valve 1.

Figure 4C:
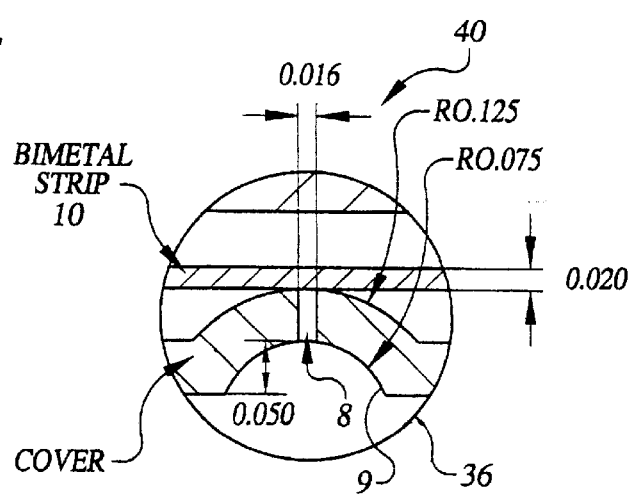
FIG. 4C is a magnified view of a portion of FIG. 4A.

FIG. 4C is an expanded view of the portion 36 of the encasement 9 having the opening 8 formed therein. The portion of the flow control apparatus 1 shown in FIG. 4C corresponds to the flow control valve 40 of the flow control apparatus 1. With reference again to FIG. 4A, when the flow control apparatus is connected at end 2 to a water spigot or water hose, and the water spigot is turned on, water flows into a cavity 41 formed within the housing 7 of the apparatus. An opening 43 formed in the housing 7 allows water to flow from the cavity 41 into the encasement 9 such that the encasement 9 is generally filled with water and the flow control valve 40 is surrounded by water.

When the flow control valve 40 is in the position shown in FIG. 4C, i.e., when the bi-metal strip 10 is flush against the opening 8, water is prevented from flowing out of the opening 8. Thus, when the shut-off valve 5 is closed and the flow control valve 40 is closed, water is held within the cavity 41 and within the encasement 9 and is prevented from flowing out of the flow control apparatus 1. Preferably, a small, rubber seal (not shown) is fixed to the bi-metal strip 10 at the location on the bi-metal strip 10 that is above the opening 8 when the valve is closed. The rubber seal prevents water from passing through the opening 8 when the valve is closed.

The flow control valve 40 preferably is in the closed position when the temperature is above 37° F. When the temperature of the water contained within the cavity 41 drops below 37° F., the bi-metal strip flexes in a direction away from the opening 8, thereby allowing water contained within the encasement to flow through the opening 8 and out of the flow control apparatus 1. The flow control valve 40 will remain in this open condition until the temperature rises above 37° F. At that time, the bi-metal strip 10 will return to the closed position where it abuts the opening 8.

It should be noted that the temperature at which the flow control valve 40 opens and closes is dependent upon the temperature characteristics of the bi-metal strip 10. As will be understood by those skilled in the art, a bi-metal strip can be manufactured in virtually an infinite number of ways to achieve the desired temperature characteristics. In other words, the bi-metal strip 10 can be manufactured to flex away from the opening 8 and to return to its home position where it abuts the opening 8 at many different temperatures. Therefore, those skilled in the art will understand that the temperature or range of temperatures at which the flow control valve 40 opens and closes is not limited to any particular temperature or range of temperatures.

The bi-metal strip 10 preferably is manufactured so that when secured in place it will cause the flow control valve 40 to open and close at such temperatures that water is allowed to flow out of the flow control apparatus 1 at a temperature or range of temperatures that prevent water from freezing within the cavity 41 or within the conduit to which the flow control apparatus 1 is secured, while also conserving water. For example, if the flow control valve 40 were to open at a temperature of 45° F., a significant amount of water would be allowed to flow out of the flow control apparatus 1 before the temperature of the water within the cavity 41 ever reaches the freezing temperature of water, assuming the temperature of the water eventually reaches 32° F.

In contrast, if the flow control valve 40 did not open until the temperature of the water within the cavity 41 reached 34° F., the water would be freezing, but water would also be conserved to the extent possible. It should also be noted that the flow control apparatus 1 has been designed in such a way that, when properly assembled, only the necessary amount of water to prevent it from freezing is allowed to flow out of the apparatus 1 through the opening 8. This feature of the flow control apparatus 1 also allows water to be conserved to the extent possible while preventing the water from freezing. However, those skilled in the art will understand that the dimensions shown in the design of the flow control apparatus 1 can be buried without deviating from the scope of the present invention.

Referring again to FIG. 4A, the O-rings 12 and 13 provide watertight seals that prevent water from flowing out of the shut-off valve 5 at all times and to prevent water from flowing out of the end 4 of the flow control apparatus 1 when the shut-off valve is closed. The opening 18 formed through the ball 11 of the flow control valve 5 is large enough to allow water to flow into a garden house connected to the end 4 of the apparatus 1 with appropriate pressure. As stated above, the flow control apparatus 1 may simply function as a cap when the shut-off valve 5 is closed. In some cases, water spigots on the outside of buildings are only used for performing certain tests, such as testing the pressure of water flowing through the conduit connected to the water spigot. In these cases it is desirable to cap the water spigot, since there is no need to connect it to a water hose. In this case, the shut-off valve 5 is simply kept in the closed position.

Figure 5A:
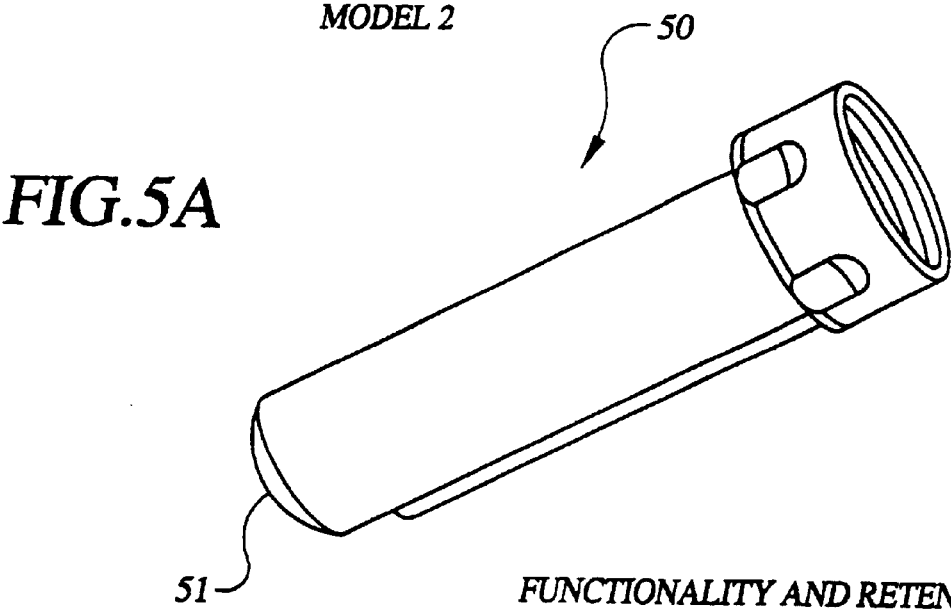
FIGS. 5A and 5B are perspective views of the apparatus of the present invention in accordance with another embodiment.
Figure 5B:
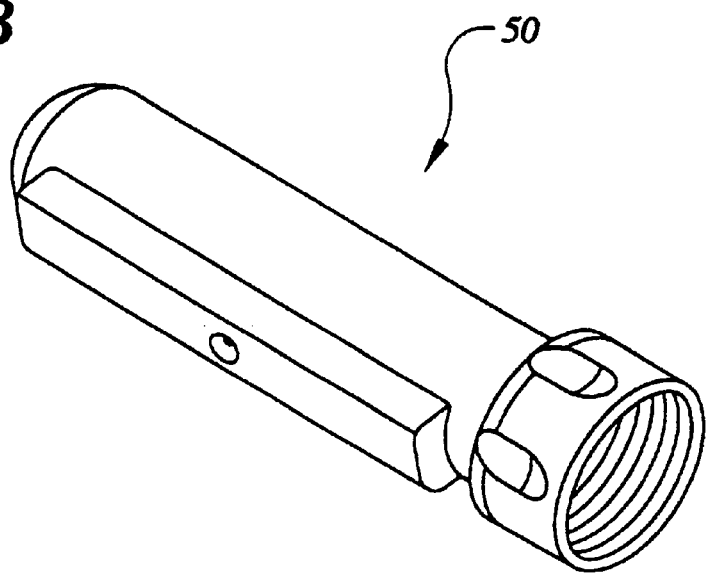

FIGS. 5A and 5B illustrate modified embodiments of the flow control apparatus 1 discussed above with reference to FIGS. 1A–4C. The flow control apparatus 50 shown in FIGS. 5A and 5B is designed to simply function as a cap to be placed on the end of a water spigot. The design of the flow control apparatus 50 is substantially identical to that of the flow control apparatus 1 discussed above except that the end 51 is capped rather than threaded with male threads to mate with the female threaded end of a water hose and the shut-off valve 5 has been eliminated. Therefore, the flow control apparatus 50 is specifically designed for situations where it is intended to be used simply to cap the end of the water spigot or water hose.

Figure 6A:
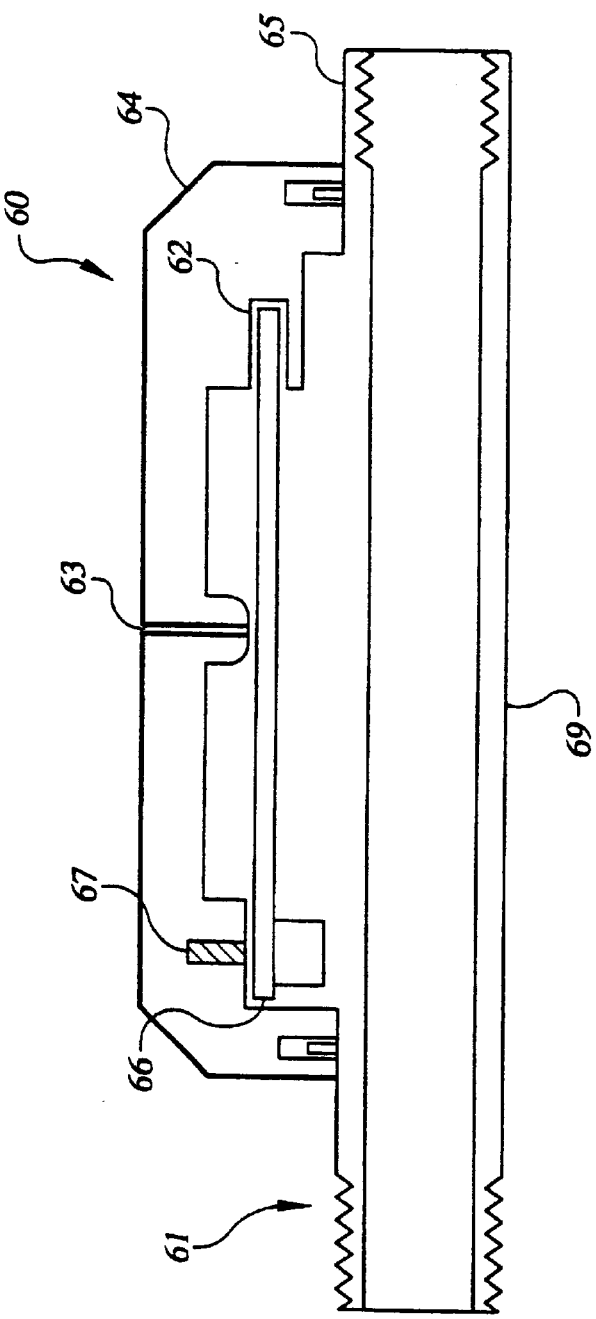
FIG. 6A is a side-cross-sectional view of the apparatus of the present invention in accordance with another embodiment.
Figure 6B:
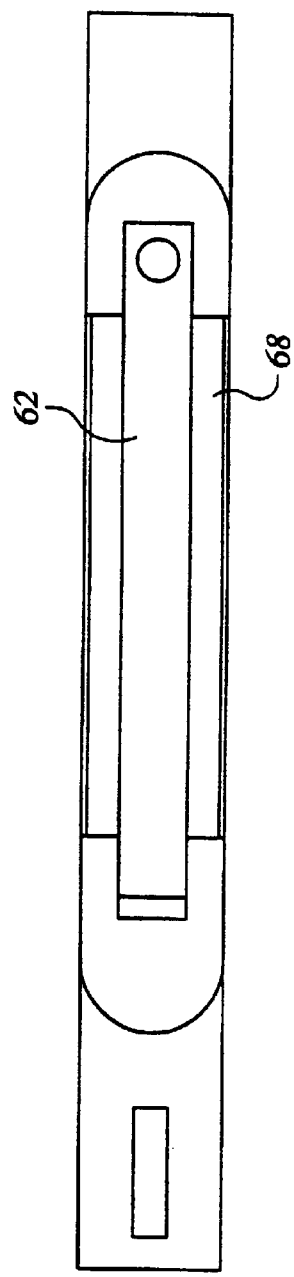
FIG. 6B is a plan view of the apparatus shown in FIG. 6A.

FIGS. 6A and 6B illustrate an alternative embodiment of the flow control apparatus shown in FIGS. 1A–4C. Once again, one end of the apparatus 60 is configured to mate with a water spigot and the other end is configured to mate with a water hose. The flow control apparatus 60 shown in FIGS. 6A and 6B may also contain a shut-off valve to enable the apparatus 60 to function to supply water to a water hose or simply as a cap. The design shown in FIGS. 6A and 6B is similar to the design shown in FIG. 1 in that a bi-metal strip 62 functions as the thermostat of the apparatus 60 to open and close an opening 63 formed in an encasement 64 coupled to the housing 65. Also, the bi-metal strip 62 functions somewhat differently from the bi-metal strip 10 in that the bi-metal strip 62 is only secured on one end 66 thereof by a fastener 67.

As with the embodiment of FIGS. 1A–4C, the bi-metal strip 62 is designed such that it flexes away from the opening 63 when the temperature of the water within the apparatus 60 reaches a particular temperature and moves back toward and abuts the opening 63 when the temperature of the water reaches another temperature. Water surrounds the bi-metal strip 62 because the opening 68 formed in the encasement 64, which receives water from the cavity 69 formed in the apparatus 60, is wider than the bi-metal strip 62 and extends above the bi-metal strip 62, as shown in FIG. 6A.

Figure 7A:
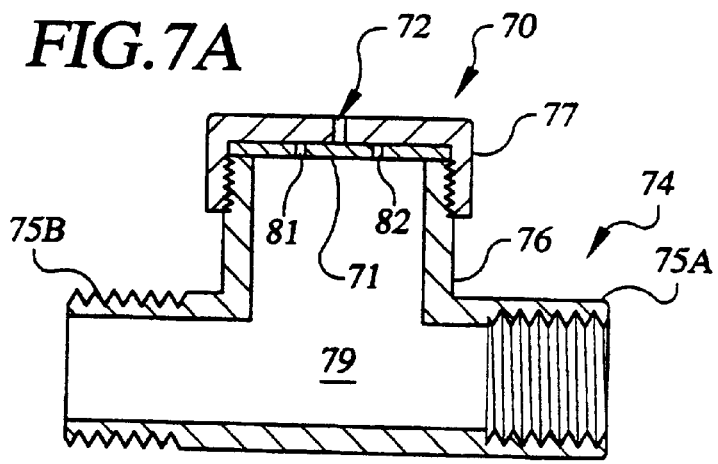
FIGS. 7A and 7B are cross-sectional views of the apparatus of the present invention in accordance with another embodiment.
Figure 7C:
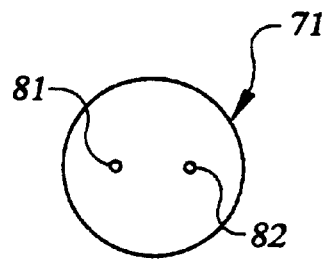
FIG. 7C is shows a top-view of a portion of FIGS. 7A and 7B.
Figure 7B:
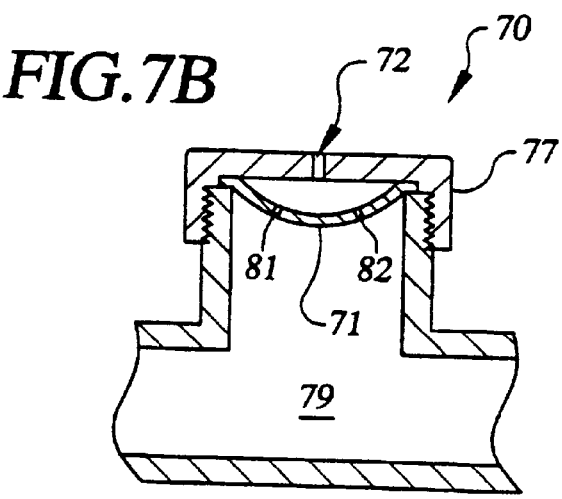

FIGS. 7A and 7B illustrate an alternative embodiment of the flow control apparatus of the present invention. In accordance with this embodiment, a bi-metal disk 71 in combination with an opening 72 formed in the apparatus 70 function as the flow control valve. The embodiment shown in FIGS. 7A and 7B is capable of being assembled with off-the-shelf parts. The key structure 74 formed by the longitudinal ends 75A and 75B and by vertical end 76 is currently available on the market in suitable dimensions for use with the present invention. Likewise, the cap 77 with suitable dimensions to mate with the vertical end 76 is also available on the market in suitable dimensions. Of course, the components of the apparatus 70 can be manufactured to meet the specific objectives of the present invention. Suitable bi-metal disks are also available on the market or can be specifically manufactured to meet the objectives of the present invention.

FIG. 7C shows a top view of the bi-metal disk 71 of the present invention. As with the embodiments discussed above, one end 75A has female threads for mating with the male threads of a water spigot and an end 75B for mating with the female threads of an end of a water hose. Although the cap 77 is shown having female threads that mate with male threads of the vertical end 76 of the housing 74, this is merely for the purpose of enabling off-the-shelf components to be used to produce the apparatus 70. The cap 77 also could be fixedly secured by some other configuration or technique to the housing 74 or could be integrally formed therewith. In the embodiment shown in FIGS. 7A and 7B, the cap 77 is utilized to secure the periphery of the bi-metal strip 71 in place. Of course, a separate mechanism could be used for securing the bi-metal strip 71 in place.

FIG. 7A illustrates the flow control apparatus 70 when the flow control valve is closed, i.e., when the bi-metal strip 71 is flush against the opening 72, thereby preventing water within the cavity 79 from flowing through the opening 72 out of the apparatus 70. FIG. 7B illustrates the flow control valve in the open position wherein the bi-metal strip 71 has flexed away from the opening 72 to allow water to flow through openings 81 and 82 formed in the bi-metal strip 71 and through opening 72 formed in the cap 77 out of the apparatus 70. When the flow control valve is in the closed position, the openings 81 and 82 formed in the bi-metal disk abut the inner surface of the cap 77 so that water is prevented from flowing through those openings.

Figure 8:
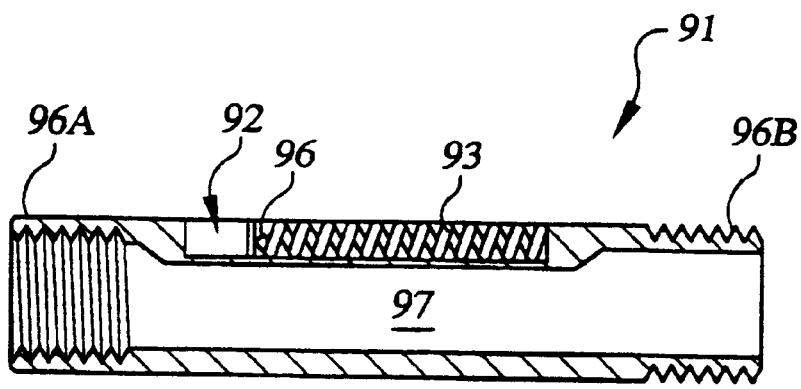
FIG. 8 is a side-cross-sectional view of the apparatus of the present invention in accordance with another embodiment.
Figure 9:
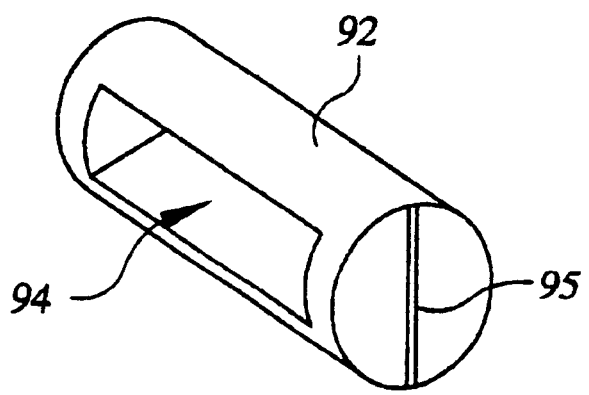
FIG. 9 is a perspective view of the apparatus shown in FIG. 8.

FIG. 8 illustrates an alternative embodiment of the present invention wherein the flow control valve is a rotating valve actuated by a helix coil, which is a bi-metal helix coil. FIG. 9 illustrates a perspective view of the rotating valve 92, which has an opening 94 formed therethrough and a slot 95 formed in an end thereof. As with the embodiments discussed above, the flow control apparatus 91 comprises an end 96A that is configured with female threads for mating with the male threads of a water spigot and an end 96B that is configured with male threads for mating with the female threads of an end of a water hose.

In the embodiment shown in FIG. 8, the flow control valve is triggered by the air temperature, rather than by the temperature of water passing through the apparatus 91. The bi-metal strip 93 has an end 96 that is located within the slot 95 of the rotating valve 92. When the air temperature reaches a particular temperature, the bi-metal strip 93 begins to expand, which causes it to rotate. The rotation of the bi-metal helix coil 93 causes the valve 92 to rotate to an open position at which the opening 94 formed through the valve 92 aligns with openings formed in the housing of the apparatus 91 adjacent the valve 92, thereby allowing water to flow out of the cavity 97 through the opening 94 in the valve 92 and out of the apparatus 91.

Figure 10:
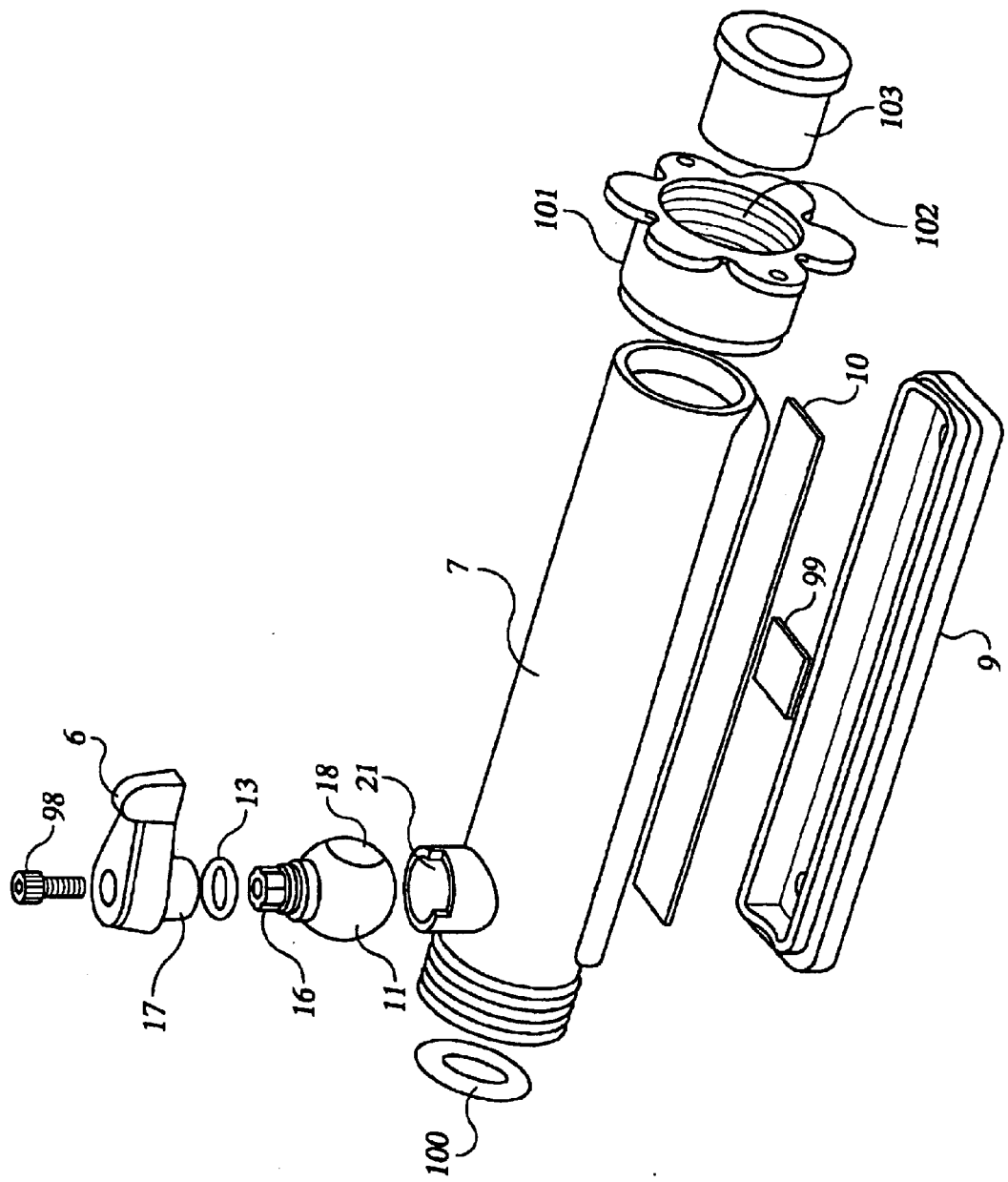
FIGS. 10 and 11 are exploded perspective views of another embodiment.
Figure 11:
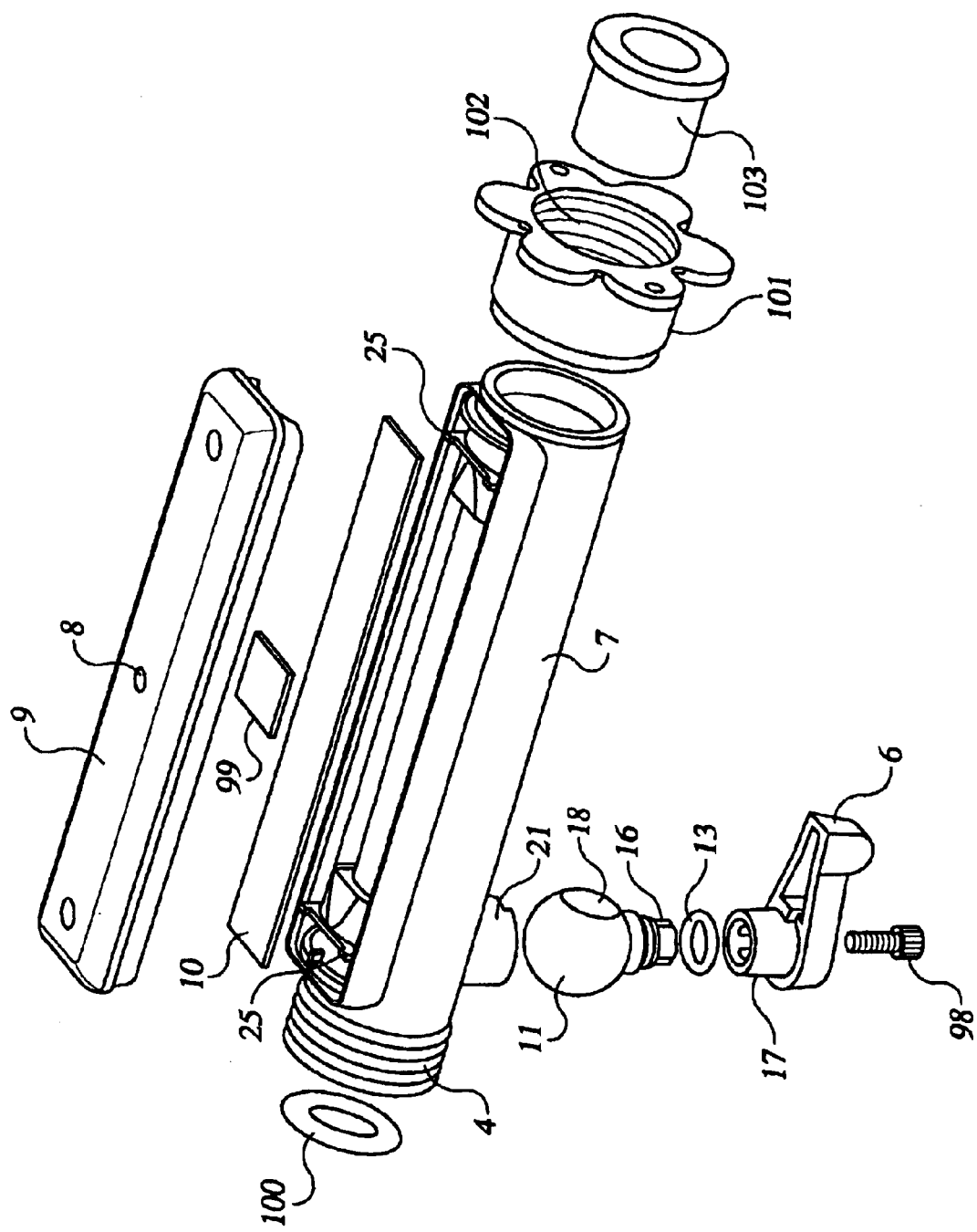

FIG. 10 illustrates an alternative embodiment wherein the faucet fitting has a swiveling connector to the body of flow control apparatus. FIG. 11 illustrates a perspective view of FIG. 10. In the embodiment shown in FIG. 10, the faucet fitting 101 is a swiveling connector with female threads 102 for mating with the male threads of a water spigot and a retainer 103 to prevent water leakage. Retainer is fixed to interior of body to rotatably retain the faucet fitting. Specifically, retainer includes a flange that forms an interference fit with an interior surface of the faucet fitting.

FIG. 11 illustrates a perspective view of FIG. 10 wherein the flow control body 7 can be rotated using the swiveling connector of the faucet fitting 101 such that the opening 8 can be located in any direction. The component parts of FIG. 10 and FIG. 11 with three exceptions have been described in detail in FIG. 2 and FIG. 3 and will not t be described again here. The exceptions include an O-ring 100 in the male threaded end 4 of the apparatus, a bi-metal strip seal 99, and a screw 98. The O-ring 100 provides a watertight seal that prevents water from flowing out of the shut-off valve 5 at all times and to prevent water from flowing out of the end 4 of the flow control apparatus 1 when the shut-off valve is closed. The bi-metal strip seal 99 prevents water leakage between the bi-metal strip 10 and the opening 8. The screw 99 secures the lever 6 onto the upper end 16 of the ball stem 15.

As illustrated by the various embodiments of the present invention discussed above, it can be seen that the flow control apparatus of the present invention can be designed in many different ways to meet the objectives of the present invention. The embodiments discussed above are the preferred and exemplary embodiments, but are not intended to represent all of the possible designs of the flow control apparatus of the present invention. Those skilled in the art will understand that modifications can be made to the embodiments discussed above without deviating from the scope of the present invention. For example, the bi-metal elements that are utilized as thermostats could possibly be replaced by other types of thermostats that would perform the necessary functions. Those skilled in the art will understand that other types of modifications may also be made and that all such modifications are within the scope of the present invention.

What is claimed is:

1. A flow control apparatus for controlling a flow of water, the apparatus comprising:

a first end and a second end, the first end being configured to be attached to a water conduit;

a flow control valve, the flow control valve comprising a thermostat and an opening formed in the flow control apparatus, the thermostat preventing water from flowing through said opening and out of the flow control apparatus when a first condition occurs and allowing water to flow through said opening and out of the flow control apparatus when a second condition occurs; and a valve having a valve opening formed therethrough, and wherein the bi-metal element actuates said valve, wherein when said first condition occurs, the valve is in a closed position, thereby preventing water from flowing through said valve opening, and wherein when said second condition occurs, the bi-metal element moves the valve to a second position, thereby allowing water within said flow control apparatus to flow out of said valve opening;

wherein the first condition corresponds to air temperature rising above a particular temperature and wherein said second condition corresponds to air temperature dropping below a particular temperature;

wherein the thermostat comprises a bi-metal element;

wherein the bi-metal element abuts said opening when said first condition occurs, thereby preventing water from flowing through said opening and out of said flow control apparatus and wherein said bi-metal element moves away from said opening when said second condition occurs, thereby allowing water to flow through said opening and out of said apparatus; and wherein said valve is a rotating valve and wherein said bi-metal element is a bi-metal helix coil, an end of the bi-metal helix coil being secured to an end of the rotating valve such that when the air temperature drops below a particular temperature, the bi-metal helix coil expands and rotates thereby causing the rotating valve to rotate to a position where said valve opening aligns with said opening to allow water within said flow control apparatus to flow through said valve opening and said opening and out of said flow control apparatus.

2. The apparatus of claim 1, wherein the first end is comprised of a swiveling connector, the connector allowing the opening to be rotated among various positions.

3. The apparatus of claim 2, wherein the swiveling connector is configured to allow the opening to be rotated about an axis of rotation.

4. A flow control apparatus for controlling a flow of water, the apparatus comprising:

a first end and a second end, the first end being configured to be attached to a water conduit; and a flow control valve, the flow control valve comprising a thermostat and an opening formed in the flow control apparatus, the thermostat preventing water from flowing through said opening and out of the flow control apparatus when a first condition occurs and allowing water to flow through said opening and out of the flow control apparatus when a second condition occurs;

wherein the thermostat comprises a bi-metal element;

wherein the bi-metal element abuts said opening when said first condition occurs, thereby preventing water from flowing through said opening and out of said flow control apparatus and wherein said bi-metal element moves away from said opening when said second condition occurs, thereby allowing water to flow through said opening and out of said apparatus; and wherein the first end is comprised of a swiveling connector, the connector allowing the opening to be rotated among various positions.

5. The apparatus of claim 4, wherein the first condition corresponds to water flowing through said flow control apparatus rising above a particular temperature, and wherein said second condition corresponds to water flowing through said flow control apparatus dropping below a particular temperature.

6. The apparatus of claim 4, wherein the thermostat is a bi-metal disk, wherein when the first condition occurs the bi-metal disk abuts said opening, and wherein when the second condition occurs the bi-metal disk flexes away from said opening, the bi-metal disk having at least one aperture formed therein, and wherein when the bi-metal disk flexes away from said opening, water flows through said aperture and through said opening and out of the apparatus.

7. The apparatus of claim 6, wherein the first condition corresponds to water within said flow control apparatus reaching a particular temperature, and wherein the second condition corresponds to water within said flow control apparatus dropping below a particular temperature.

8. The apparatus of claim 4, further comprising:

a valve having a valve opening formed therethrough, and wherein the bi-metal element that actuates said valve, wherein when said first condition occurs, the valve is in a closed position, thereby preventing water from flowing through said valve opening, and wherein when said second condition occurs, the bi-metal element moves the valve to a second position, thereby allowing water within said flow control apparatus to flow out of said valve opening.

9. The flow control apparatus of claim 4, wherein the first condition corresponds to air temperature rising above a particular temperature and wherein said second condition corresponds to air temperature dropping below a particular temperature.

10. The apparatus of claim 4, wherein the thermostat is a bi-metal strip, wherein when the first condition occurs the bi-metal strip abuts said opening, and wherein when the second condition occurs the bi-metal strip flexes away from said opening, the bi-metal strip having at least one aperture formed therein, and wherein when the bi-metal strip flexes away from said opening, water flows through said aperture and through said opening and out of the apparatus.

11. The apparatus of claim 10, wherein the first condition corresponds to water within said flow control apparatus reaching a particular temperature, and wherein the second condition corresponds to water within said flow control apparatus dropping below a particular temperature.

12. A flow control apparatus for controlling a flow of water, the apparatus comprising:

a first end and a second end, the first end being configured to be attached to a water conduit;

a flow control valve, the flow control valve comprising a thermostat and an opening formed in the flow control apparatus, the thermostat preventing water from flowing through said opening and out of the flow control apparatus when a first condition occurs and allowing water to flow through said opening and out of the flow control apparatus when a second condition occurs;

a shut-off valve that can be placed in an open or closed position, wherein when the shut-off valve is in the open position, water flowing into the first end of the flow control apparatus is allowed to flow through the flow control apparatus and out of the second end of the flow control apparatus, wherein when the shut-off valve is in the closed position, water flowing into the first end of the flow control apparatus is prevented from flowing out of the second end of the flow control apparatus;

wherein the first end is comprised of a swiveling connector, the connector allowing the opening to be positioned in any direction.

13. The apparatus of claim 12, wherein the thermostat comprises a bi-metal element.

14. The apparatus of claim 13, wherein the bi-metal element abuts said opening when said first condition occurs, thereby preventing water from flowing through said opening and out of said flow control apparatus and wherein said bi-metal element moves away from said opening when said second condition occurs, thereby allowing water to flow through said opening and out of said apparatus.

15. The apparatus of claim 14, wherein the thermostat is a bi-metal disk having at least one opening therein, wherein when the first condition occurs the bi-metal disk abuts said opening, and wherein when the second condition occurs the bi-metal strip disk flexes away from said opening, the bi-metal disk having at least one aperture formed therein, and wherein when the bi-metal disk flexes away from said opening, water flows through said aperture and through said opening and out of the apparatus.

16. The apparatus of claim 14, wherein the thermostat is a bi-metal strip, wherein when the first condition occurs the bi-metal strip abuts said opening, and wherein when the second condition occurs the bi-metal strip flexes away from said opening, the bi-metal strip having at least one aperture formed therein, and wherein when the bi-metal strip flexes away from said opening, water flows through said aperture and through said opening and out of the apparatus.

17. The apparatus of claim 12, wherein the first condition corresponds to water within said flow control apparatus reaching a particular temperature, and wherein the second condition corresponds to water within said flow control apparatus dropping below a particular temperature.

18. The apparatus of claim 12, further comprising:

a valve having a valve opening formed therethrough, and wherein the thermostat is comprised of a bi-metal element that actuates said valve, wherein when said first condition occurs, the valve is in a closed position, thereby preventing water from flowing through said opening, and wherein when said second condition occurs, the bi-metal element moves the valve to a second position, thereby allowing water within said flow control apparatus to flow out of said opening.

19. The flow control apparatus of claim 18, wherein the first condition corresponds to air temperature rising above a particular temperature and wherein said second condition corresponds to air temperature dropping below a particular temperature.

20. The apparatus of claim 19, wherein said valve is a rotating valve and wherein said bi-metal element is a bi-metal helix coil, an end of the bi-metal helix coil being secured to an end of the rotating valve such that when the air temperature drops below a particular temperature, the bi-metal helix coil expands and rotates thereby causing the rotating valve to rotate to a position where said valve opening aligns with said opening to allow water within said flow control apparatus to flow through said valve opening and said opening and out of said flow control apparatus.

21. The apparatus of claim 12, wherein the swiveling connector is configured to allow the opening to be positioned in any direction about an axis of rotation.

\* \* \* \* \*